March 20, 1928.

S. W. SIMON

MILK BOTTLE CAP REMOVER

Filed May 31, 1927

1,662,941

Inventor
S. W. Simon,

By Clarence A. O'Brien
Attorney

Patented Mar. 20, 1928.

1,662,941

UNITED STATES PATENT OFFICE.

STONE WALL SIMON, OF BEAUMONT, TEXAS.

MILK-BOTTLE-CAP REMOVER.

Application filed May 31, 1927. Serial No. 195,319.

The present invention relates to a simple and efficient device for facilitating the removal of the disc stoppers from milk bottles in such a manner as to prevent any possibility of the milk splashing during the removal of the stopper.

One of the important objects of the present invention is to provide a device of the above mentioned character wherein a disc stopper may be removed from the milk bottle in a comparatively simple and efficient manner, the stopper removing device including a casing which is open at its lower front side to accommodate the neck of a milk bottle, a pointed pin projecting into the intermediate portion of the casing from the rear side thereof, and which pointed pin is adapted to pierce the disc stopper when the milk bottle it tilted and slightly moved rearwardly when disposed adjacent the pin so that the disc stopper will be held on the pin until the opened milk bottle is removed from the casing whereupon means is associated with the pin for ejecting the removed stopper from the pin.

A still further object of the invention is to provide a milk bottle cap remover which is sanitary, the same being further simple in construction, inexpensive, strong and durable, and further well adapted to the purpose for which it is designed.

Other objects and advantages of the invention will become apparent from the following description taken in connection with the accompanying drawing.

In the accompanying drawing forming part of this application:

Figure 1:
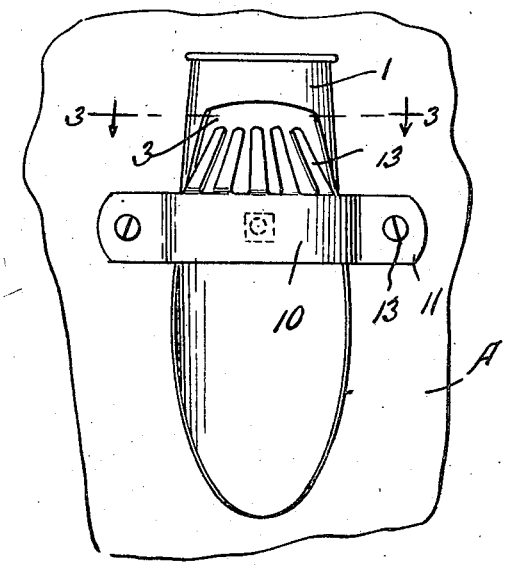
Figure 1 is a side elevation of the device embodying my invention.

In the drawing wherein for the purpose of illustration is shown the preferred embodiment of my invention, the numeral 1 designates a cylindrical casing, the same being closed at its upper end as illustrated at 2, while the lower end is open and as is clearly shown in the drawing, the front side of the casing is cut away as indicated at 3. The lower end portions of the sides of the cut away portion 3 are slightly rounded, as is clearly shown in Figure 2.

A bracket 4 fits around the rear side of the intermediate portion of the casing 1, and is provided with laterally extending attaching ends 5 for attachment to a wall or other support and the casing 1 is secured to this bracket 4 by means of a pin 6, the rear end of which is threaded and extends through the rear side of the intermediate portion of the casing 1 and through the intermediate portion of the bracket 4, a nut 7 being threaded on the outer threaded end of this pin for engagement against the outer face of the intermediate portion of the bracket 4.

Figure 2:
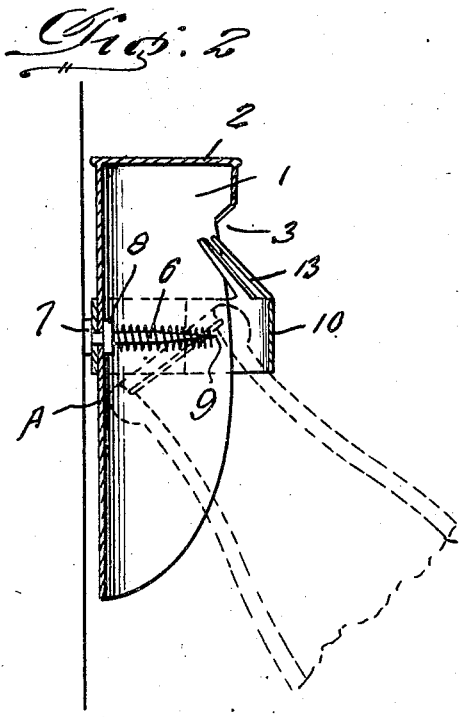
Figure 2 is a vertical sectional view therethrough showing the manner in which a disc stopper is removed from the milk bottle.
Figure 3:
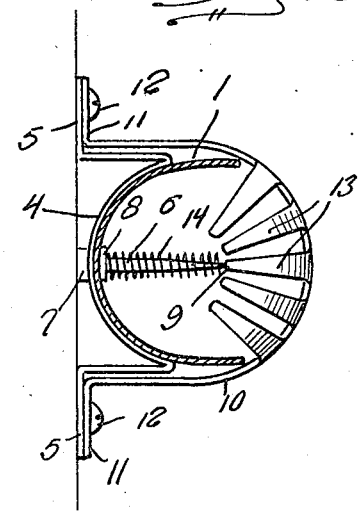
Figure 3 is a sectional view taken substantially on the line 3—3 of Figure 1, looking downwardly.

A collar 8 is formed on the pin 6 adjacent its rear threaded end and this collar 8 is adapted for disposition against the inner face of the rear side of the casing as is clearly shown in Figures 2 and 3 of the drawing. The forward free end of the pin which extends into the casing is pointed as at 9 and the purpose thereof will be hereinafter more fully described.

An elongated relatively wide strip of metal is bent into substantially U-shaped formation, and this U-shaped member 10 extends around the open front side of the casing in alinement with the attaching bracket 4, the U-shaped member 10 being of substantially the same width as the bracket 4, and the free ends of the arms of this U-shaped member are disposed laterally as at 11 for disposition against the laterally projecting ends 5 of the bracket 4 and suitable securing screws 12 extend through registering openings formed in the laterally disposed ends 5 and 11 of the bracket 4 and the U-shaped member 10 respectively for securing the bracket and the U-shaped member rigidly to the wall A. In this manner the casing 1 will be rigidly supported in a vertical position.

As is clearly shown in the drawing, the base or crown portion of the U-shaped member 10 has formed on the upper edge thereof the spaced fingers 13 and these fingers are slightly bent inwardly and disposed in converging relation for disposition within the upper portion of the open front side 3 of the casing 1. These fingers 13 provide a guard for closing the upper open front side of the casing.

An expansible coil spring 14 is arranged on the horizontally disposed pointed pin 6. One end of this coil spring 14 is attached to the collar 8 in an appropriate manner, while the other end is free for slidable movement on the forward free end portion of the pin.

In use, a sealed bottle of milk is inserted in the lower open front side of the casing in the manner shown in Figure 2, the bottle being held in a tilted position so that the pointed end 9 of the pin will pierce the disc stopper and the piercing of the stopper by the pin is accomplished by slightly moving the milk bottle rearwardly. As soon as the milk bottle is removed from the casing after the stopper has been removed therefrom, the spring 14 which is placed under tension during the removal of the disc stopper from the bottle will automatically eject the stopper from the pin and a suitable receptacle, not shown, is preferably placed beneath the casing to catch the punctured disc stopper so that the same will not fall on the floor and after the stopper has been removed from the pin, the device is again ready for use.

It is of course to be understood that the pin and the spring are formed of a non-corrosive or rustproof metal, as well as the other metallic parts of the invention. Due to the provision of the finger 13, the stopper cannot be discharged through the upper portion of the open front side of the casing, but necessarily fall in a downward direction when ejected from the pin by the expansible spring 14.

It will thus be seen from the foregoing description that I have provided a bottle cap remover which will at all times be positive and efficient in its operation and by the provision of such a device, a stopper can be removed from the bottle without any possibility of the contents of the bottle splashing during the removal of the stopper therefrom, and furthermore the stopper can be removed in an expeditious manner. Furthermore, a bottle cap remover of the character such as is embodied in the present invention will be sanitary and will thereby eliminate the depositing of possible germs caused by removing the stopper from the bottle by use of the fingers as is now commonly done.

While I have shown the preferred embodiment of my invention, it is to be understood that minor changes in the size, shape and arrangement of parts may be resorted to without departing from the spirit of the invention and the scope of the appended claims.

Having thus described the invention, what I claim as new is:—

1. A device of the class described comprising a casing adapted to be supported in a vertical position, the front side of the casing being open, to accommodate the neck of a milk bottle, and a stopper removing pin projecting from the rear side of the intermediate portion of the casing adapted to pierce and remove the stopper from the bottle when the latter is tilted.

2. A device of the class described comprising a casing adapted to be supported in a vertical position, the front side of the casing being open, to accommodate the neck of a milk bottle, and a stopper removing pin projecting from the rear side of the intermediate portion of the casing adapted to pierce and remove the stopper from the bottle when the latter is tilted, and means for ejecting the stopper from the pin when the opened bottle is removed from the casing.

3. A device of the class described comprising a casing adapted to be supported in a vertical position, the front side of the casing being open to accommodate the neck of a milk bottle, a stopper removing pin projecting from the rear side of the intermediate portion of the casing adapted to pierce and remove the stopper from the bottle when the latter is tilted, means for ejecting the stopper from the pin when the opened bottle is removed from the casing, said last mentioned means comprising an expansible coil spring encircling the pin and adapted to be compressed when the pin pierces the stopper.

4. In a device of the class described, a vertically disposed casing open at its front side, an attaching bracket carried by the casing, a stopper removing pin projecting forwardly from the rear side of the casing at the intermediate portion thereof, and adapted to pierce and remove the stopper from a milk bottle when the latter is inserted in the open front side of the casing and is tilted, and a guard for the upper portion of the open front side of the casing.

5. In a device of the class described, a vertically disposed casing open at its front side, an attaching bracket carried by the casing, a stopper removing pin projecting forwardly from the rear side of the casing at the intermediate portion thereof, and adapted to pierce and remove the stopper from a milk bottle when the latter is inserted in the open front side of the casing and is tilted, a guard for the upper portion of the open front side of the casing, said guard comprising a U-shaped band extending around the open front side of the casing, the ends of the U-shaped band being secured to the bracket, and guard fingers projecting upwardly and slightly inwardly from the upper edge of the band.

6. In a device of the class described, a vertically disposed casing open at its front side, an attaching bracket carried by the casing, a stopper removing pin projecting forwardly from the rear side of the casing at the intermediate portion thereof, and adapted to pierce and remove the stopper from a milk bottle when the latter is inserted in the open front side of the casing and is tilted, a guard for the upper portion of the open front side of the casing, said guard comprising a U-shaped band extending around the open front side of the casing, the ends of the U-shaped band being secured to the bracket, guard fingers projecting upwardly and slightly inwardly from the upper edge of the band, and an expansible spring arranged on the pin for ejecting the stopper from the pin when the opened bottle is moved away from the pin.

In testimony whereof I affix my signature.

STONE WALL SIMON.